United States Patent [19]

Magarian

[11] 4,149,922

[45] Apr. 17, 1979

[54] STRIPPING PLASTIC PIPE FROM A MANDREL

[75] Inventor: Gerald M. Magarian, Long Beach, Calif.

[73] Assignee: Ameron, Inc., Monterey Park, Calif.

[21] Appl. No.: 842,624

[22] Filed: Oct. 17, 1977

[51] Int. Cl.² .............................................. B32B 1/08
[52] U.S. Cl. .................................. 156/344; 156/154; 156/584
[58] Field of Search .............. 156/344, 584, 154, 173, 156/175, 247, 248, 268

[56] References Cited

U.S. PATENT DOCUMENTS

| 2,361,026 | 10/1944 | Greene | 156/173 X |
| 3,237,294 | 3/1966 | Brandeberry | 156/344 X |
| 3,519,520 | 7/1970 | Newman, Jr. | 156/173 X |
| 3,616,063 | 10/1971 | Bradley | 156/429 X |
| 3,684,602 | 8/1972 | Ball | 156/247 X |

Primary Examiner—William A. Powell
Assistant Examiner—Thomas Bokan
Attorney, Agent, or Firm—Christie, Parker & Hale

[57] ABSTRACT

Plastic pipe is removed from a mandrel by forming two circumferential grooves of different depth in the pipe wall, attaching a holding means to the pipe where the holding means has projections which fit into the grooves, and then applying an axial force to the holder. This method prevents damage to the mandrel and the pipe.

17 Claims, 10 Drawing Figures

STRIPPING PLASTIC PIPE FROM A MANDREL

BACKGROUND OF THE INVENTION

This invention relates to removing cylindrical bodies from a mandrel, and in particular stripping plastic pipe from a mandrel.

Plastic pipe, and particularly fiber reinforced plastic pipe, is typically formed about a rotating mandrel as described in U.S. Pat. Nos. 3,519,520 and 3,616,063. Release agents are commonly coated onto the surface of the mandrel to assist removal of formed pipe from the mandrel. However, even with release agents, a common problem is how to strip the pipe from the mandrel without damaging either the pipe or the mandrel.

The method described in U.S. Pat. No. 3,519,520 includes grabbing an outer end of the pipe with grabber jaws which clamp onto the pipe. These jaws are mounted on a chain driven carriage which is pulled axially, thereby pulling the pipe off a free end of the mandrel.

Although this method is useful for removing pipe from a mandrel, it is not without disadvantages. In particular, the grabber jaws exert a radial force against the pipe and the mandrel. Due to this radial force, the pipe is pressed against the mandrel, thereby making it more difficult to slide the pipe longitudinally over the mandrel. In addition, plastic pipe has lower axial tensile strength than axial compressive strength. Therefore, the force which can be applied to the pipe when pulling pipe from a mandrel is less than the force which can be applied to the pipe when pushing the pipe from a mandrel.

Another method of removing pipe from a mandrel comprises applying high pressure water to one end of the mandrel to force it from the pipe. This method requires bolted construction at one end of the mandrel and time-consuming disassembly at the bolted end each time a pipe is removed. Overall, this method is slow, messy, and the constant exposure to water tends to corrode the mandrel.

Therefore, there is a need for a quick and clean method and apparatus for removing plastic pipe from a mandrel which damages neither the pipe nor the mandrel.

SUMMARY OF THE INVENTION

I have now invented a method and an apparatus with the above features for removing a cylindrical body such as plastic pipe from a mandrel coaxial with the body. This method comprises forming a first indentation in the pipe wall where the depth of the first indentation is less than the pipe wall thickness. A second shallower indentation axially spaced apart from the first indentation is also formed in the pipe wall. The second indentation is axially closer than the first indentation to the mandrel end over which the body is removed. The indentations preferably are formed simultaneously by a method such as contacting the rotating pipe with a grinding wheel where the circumferential edge of the grinding wheel has projections corresponding to the shape of the indentations to be formed in the pipe wall. This method of forming indentations results in parallel circumferential grooves around the pipe wall.

The next step in this method is attaching a holding means to the pipe wherein the holding means has at least two steps or flanges directed radially inwardly, one for each of the indentations. A first step is placed into the first indentation and a second step is placed into the second indentation. The radial distance the second step can travel before bottoming in the second indentation is less than the distance the first step is placed spaced apart from the mandrel.

After the holding means, which preferably comprises a cylindrical collar, is attached to the pipe, a force is applied to the holding means in a substantially axial direction to push the pipe towards the mandrel end over which the pipe is removed.

Because the second indentation is axially closer to the end of the mandrel over which the pipe is removed than the first indentation, if the pipe wall fractures at the first indentation the second indentation remains with the main portion of the pipe. Because the distance the second step can travel before bottoming in the second shallower indentation is less than the distance between the first step and the mandrel, even if the pipe fractures at the first indentation while being stripped from the mandrel, the holding means does not contact the mandrel and therefore does not damage it.

In a preferred version of this invention the first step contacts the wall of the first indentation axially closest to the mandrel end over which the pipe is removed and the second step does not contact the wall of the second indentation axially closer to the mandrel end over which the pipe is removed so that only the first indentation bears the axial stripping force.

When the ends of the pipe are of smaller diameter than the mid-section of the pipe, it is necessary to break the pipe so that it can be stripped from the mandrel. This can be accomplished by forming the first circumferential groove almost all the way through the pipe wall. Then, when an axial force is exerted on the pipe, the movement of the pipe is resisted by the section of the pipe which is smaller in diameter than the main body of the pipe, and the small diameter section of the pipe breaks off from the main body at the first groove. This is a quick and economical way to remove the waste end of the pipe.

Apparatus for practicing the method of this invention comprises a grinding wheel rotating about an axis parallel to the axis of rotation of the mandrel for forming the circumferential grooves in the pipe wall. The grinding wheel has a cutting edge having two axially spaced apart radially extending projections. One of the projections extends radially farther than the other projection. When the cutting edge of the grinding wheel contacts a pipe on a rotating mandrel two parallel circumferential grooves are formed in the pipe wall. The groove formed by the radially farther extending projection is deeper than the other groove. The radially farther extending projection is axially farther than the other projection from the mandrel end over which the pipe is removed so that the deeper groove is farther from the mandrel end over which the pipe is removed. Preferably the side wall of the radially farther extending projection of the cutting edge of the grinding wheel closest to the mandrel end over which the pipe is removed is substantially perpendicular to the surface of the pipe and the axis of rotation of the mandrel so that the wall of the first groove axially closest to the mandrel end over which the pipe is removed is substantially square shouldered and perpendicular to the axis of rotation of the mandrel so that predominantly axial forces are exerted on the pipe during the stripping operation.

The apparatus of this invention also includes a collar for engaging the circumferential grooves formed by the grinding wheel. The collar comprises a ring placeable around the pipe where the radially inner surface of the ring has two axially spaced apart circumferential steps or flanges, a first circumferential step for engaging the first circumferential groove, and a second circumferential step for engaging the second circumferential groove. The distance between the radial extension of the first step into the first groove and the mandrel outer wall is greater than the distance the second step can travel before bottoming in the second groove. Preferably the second step contacts the bottom of the second groove without the first step contacting the bottom of the first groove when the collar is placed around the pipe.

Preferably the axial distance between the surfaces of the steps of the holding means axially closest to the mandrel end over which the pipe is removed is less than the axial distance between the walls of the two projections of the cutting edge of the grinding wheel axially closest to the mandrel end over which the pipe is removed. This permits the first step of the collar to contact the wall of the first groove closest to the mandrel end over which the pipe is removed without the second step of the collar contacting the wall of the second groove axially closest to the mandrel end over which the pipe is removed. In this preferred embodiment only the first groove bears the axial stripping force when the pipe is stripped from the mandrel because the second step does not engage the wall of the second groove towards the mandrel end over which the pipe is stripped. If the pipe fractures during stripping, it fractures only at the deeper first groove. And when the pipe fractures at the first groove, damage to the mandrel is prevented because the second step of the collar seats against the bottom of the second groove before the first step of the collar can contact and score the mandrel.

The method and apparatus of this invention permits stripping of pipe from a mandrel quickly, easily, and without damage to either the pipe or the mandrel. These and other features, aspects and advantages of the present invention will become more apparent in the following drawings, detailed description of the invention, and appended claims.

DETAILED DESCRIPTION OF THE INVENTION

Figure 1:
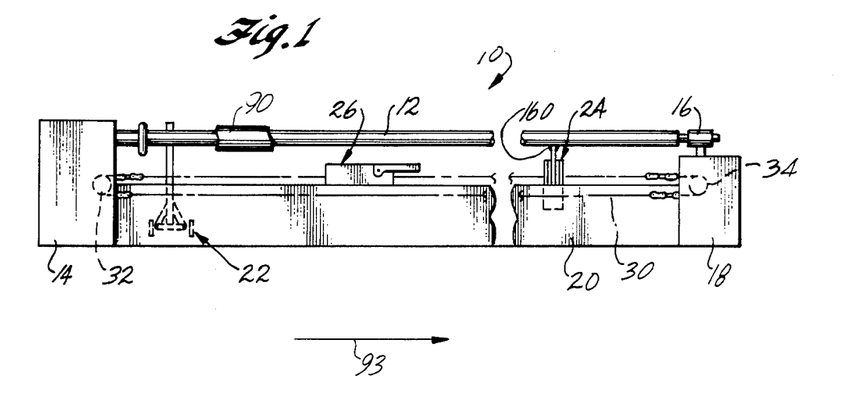
FIG. 1 is a side elevation of a pipe making machine showing the general relationship of the components of the machine.

Referring to FIG. 1, a pipe making machine includes a horizontal elongated rotatable mandrel 12 journaled at one end in a headstock assembly 14 and at the opposite end in a removable sleeve 16. The sleeve 16 is supported on a tailstock assembly 18. A main box beam 20 sits on the floor (not shown) and extends between the head and tail stock assemblies. A groove grinder assembly 22 and a retractable mandrel support assembly 24 are bolted to the side of the beam 20. A stripper assembly 26 is roller mounted on a rail of the main box beam 20. The stripper assembly 26 is pulled along the box beam by an endless chain 30 which is secured to both ends of the stripper assembly 26. The chain 30 is pulled around an end sprocket 32 secured to the head stock assembly 14 by a drive sprocket 34 at the opposite end which is driven by drive means (not shown) in the tail stock assembly 18.

In general, a pipe 90 is stripped from the mandrel by forming indentations or grooves (shown and described in detail below) in the pipe wall with the groove grinder 22, engaging the grooves with a collar 28 (FIG. 5) placed around the pipe, raising the intermediate support 24 into contact with the pipe as shown in FIG. 1, removing the sleeve 16 from the mandrel 12, engaging the collar with the stripper carriage assembly 26, and then pulling the stripper carriage assembly along the box beam 20 towards the tailstock end of the machine. Details of these steps and apparatus for performing these steps are described below.

Preferably the indentations formed in the pipe are parallel grooves extending completely circumferentially around the pipe so that uniform force is applied to the pipe as it is pulled off the mandrel. An apparatus suitable for forming circumferential grooves in the pipe wall is a grinding mechanism such as the groove grinder 22 shown in FIG. 2. The groove grinder 22 comprises a vertically oriented grinding wheel 40 partially enclosed by a housing 42 which is affixed to a hollow, vertical, rectangular column 46 pivotally secured to the side of the main beam 20.

Figure 2:
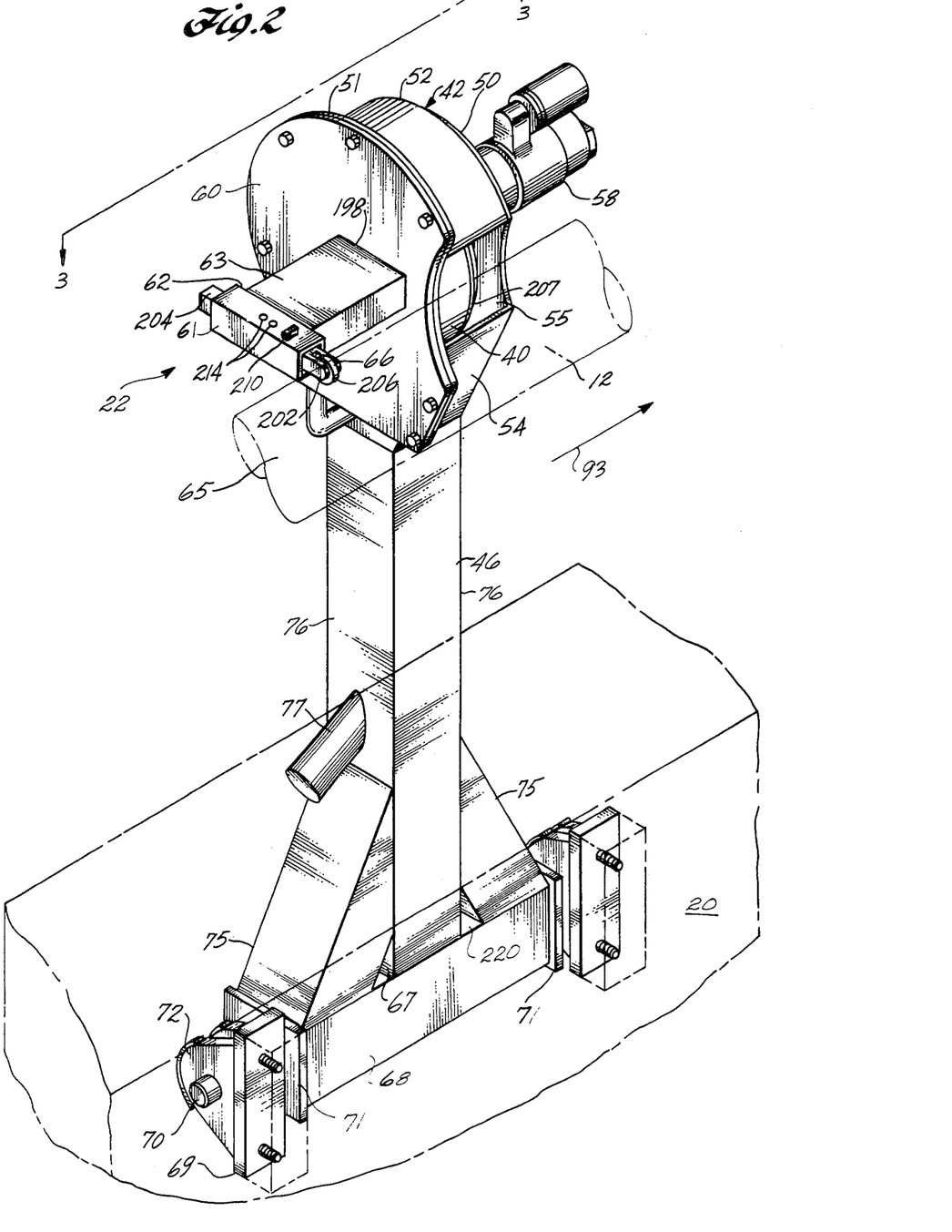
FIG. 2 is a perspective view of a groove grinder.

The grinder housing 42 comprises a side plate 50, a flange 51 attached to the column 46, a plate 52 which extends along the back of the wheel and curves over the top edge of the grinding wheel, and a plate 54 which protects the lower front edge of the grinding wheel. Both edge plates 52, 54 are welded to the hollow column 46 and the side plate 50 and flange 51. The grinding wheel 40 is only partially enclosed since both side plates are cut away and there is no edge plate in the region 55 where the grinding wheel engages pipe upon the mandrel 12.

Figure 3:
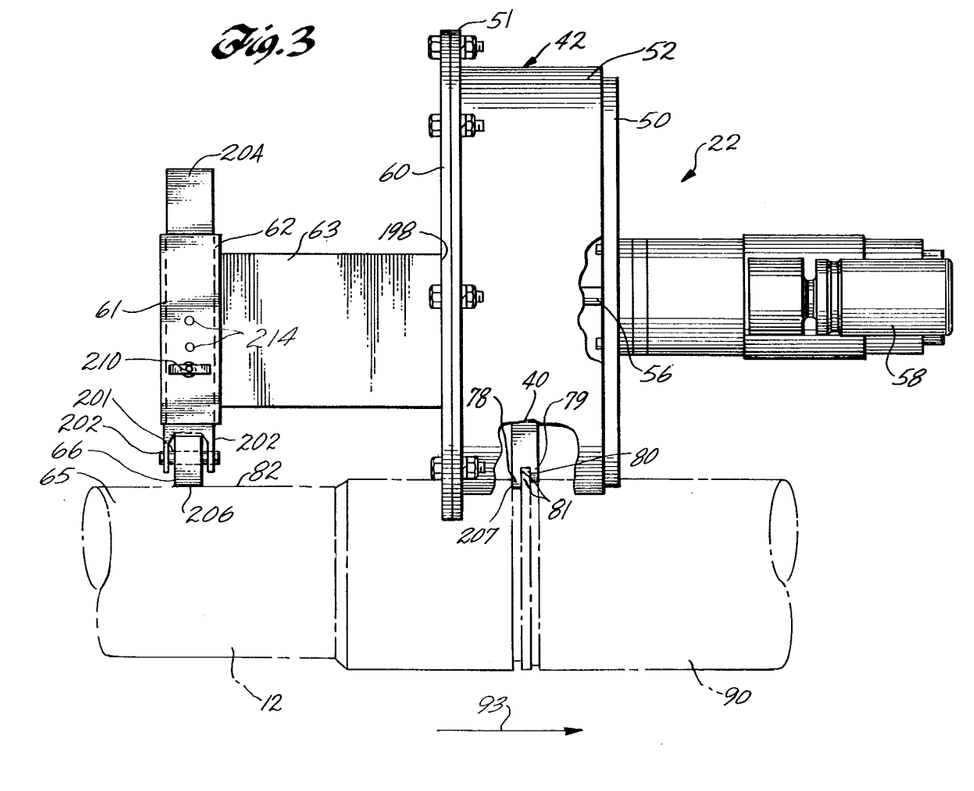
FIG. 3 is a view taken along line 3—3 in FIG. 2, in partial section.

Referring to FIG. 3, the grinding wheel 40 is mounted on a horizontal rotating shaft 56 driven by a muffled air motor 58 bolted to the outside of one of the side plates 50. The shaft is journaled through the side plate 50 to which the air motor is attached, and is parallel to the longitudinal axis of the mandrel. Bolted to the opposite flange 51 is a plate 60 which extends beyond the plates 52, 54. An elongated, rectangular tube 61 is welded to the end 62 of a plate 63, the opposite end 198 of which is welded to the plate 60. The longitudinal axis of the tube is perpendicular to the axis of rotation of the grinding wheel 40. The length of the plate 63 is such that the tube 61 extends to face the portion 65 of the mandrel not covered with pipe 90. A rigid roller 66 extending towards the mandrel a small distance beyond the leading edge of the grinding wheel 40 is mounted on a pin 201 and supported by two ears 202 of a bar 204 extending through both ends of the tube 61. The difference between the distance between the leading edge 206 of the roller 66 and the distance the leading edge 207 of the grinding wheel extends towards the mandrel determines how close the grinding wheel comes to the mandrel, because when the roller 66 engages the mandrel wall, it is impossible to push the grinding wheel any farther into the pipe. It is important that the roller extends beyond the grinding wheel so that the depth of the deeper groove cut into the pipe wall by the grinder is less than the thickness of the pipe wall so that the mandrel is not damaged during the grinding step and so the small end portion of the pipe beyond the grooves is normally removed from the mandrel along with the main body of the pipe.

The roller 66 is held in a fixed position relative to the grinding wheel by a T-handle 210 which extends through aligned holes (not shown) through rectangular tube 61 and the roller mounting bar 204. Additional holes 214 are provided through the rectangular tube 61 so that the depth of the grooves can be varied and mandrels of various diameters can be accommodated.

The bottom edge 67 of the main vertical column of the groove grinder is welded to the top surface of a horizontal rectangular beam 68 which in turn is welded to a horizontal spindle 70. The spindle extends through the length of the beam 68 and is mounted in a fixed bearing 72 at each end. Each bearing assembly is bolted against a spacer 69 on a mounting block 71 welded to the side of the main beam 20 of the pipe making machine. One of a pair of braces 75 is welded to each surface 76 facing the headstock 14 or tailstock 16 assemblies and the upper surface 220 of the horizontal beam 68 to prevent the vertical column 46 from flexing during grinding. A tubular vacuum hose connection 77 extends through a wall of the hollow vertical column 46 and into the interior of the column so that as the grinding wheel 40 grinds the pipe wall into fine dust particles, the particles are sucked into the housing and down through the vertical column into a collection device (not shown) so that the operator of the device is not exposed to potentially noxious dust.

As shown most clearly in FIG. 3 the circumferential edge of the grinding wheel preferably has two projections, a radially farther extending first projection 78 and a radially shorter second projection 79 which are separated by a recess 80. If more than two grooves are to be formed in the pipe wall, more projections are required on the edge of the grinding wheel. The second projection is closer than the first projection to the mandrel end over which the pipe is removed as indicated by arrow 93 (FIG. 3), for reasons presented below. Preferably at least the side wall 81 of the first projection 78 axially closest to the mandrel end over which the pipe is removed is perpendicular to the pipe surface and the axis of rotation of the mandrel to form a groove in the pipe wall having a square shoulder and a wall perpendicular to the axis of rotation of the mandrel, for reasons presented below.

When the grinder 22 is not being used, it sits away from the mandrel. After the plastic pipe has sufficiently cured, an operator uses the grinder by manually pivoting the grinder around its spindle 70 towards the rotating mandrel 12 having plastic pipe 90 on it, and contacts the rotating pipe with the leading edge 207 of the unenclosed portion of the rotating grinding wheel. The grinding wheel cuts into the pipe wall, thereby forming two circumferential grooves until the roller 66 contacts the mandrel wall 82. Thus two circumferential grooves are formed in the pipe wall, a first groove 84 (FIGS. 4 & 6) which is formed by the first projection 78, and a second groove 85 which is formed by the second projection 79. The depth of the first groove is less than the pipe wall thickness due to the action of the roller 66 and the depth of the second groove is less than the depth of the first groove. The second groove is axially closer than the first groove to the mandrel end over which the pipe is removed for reasons presented below. In the preferred version of this invention when side wall 81 of the first projection 78 is perpendicular to the pipe surface and the axis of rotation of the mandrel, the first groove 84 is square shouldered with the side wall 102 of the first groove closest to the mandrel end over which the pipe is removed perpendicular to the axis of rotation of the mandrel.

After preparing the indentations in the pipe wall, the mandrel is stopped and the retractable intermediate support 24 is raised to the position shown in FIG. 1 so that a roller 160 on the top of the support engages the pipe towards the tail stock end of the pipe making machine. When the intermediate support engages the pipe, it supports the portion of the mandrel weight otherwise carried by the sleeve 16. After the intermediate support is positioned, the sleeve at the tail stock end is removed from the mandrel.

Figure 5:
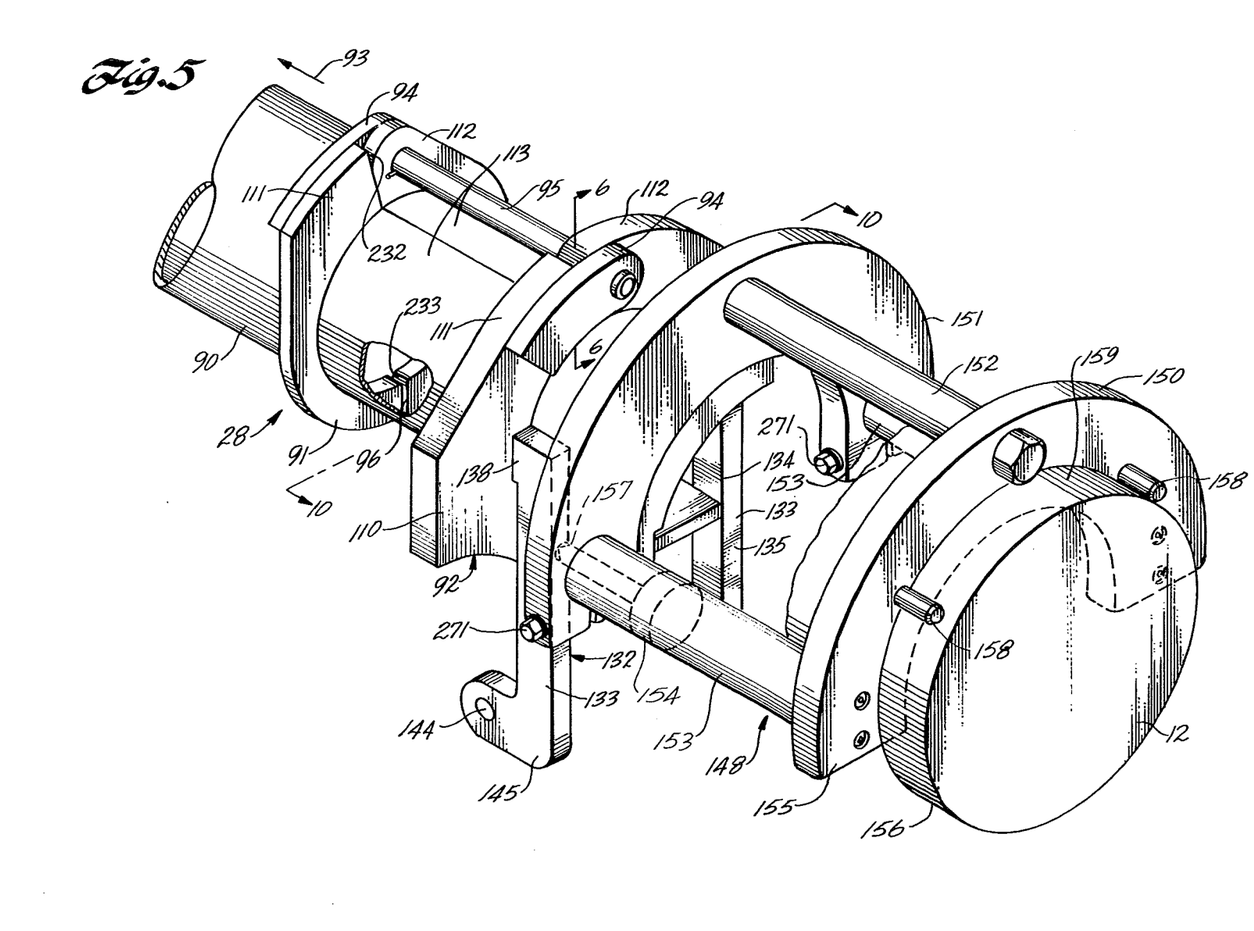
FIG. 5 shows in perspective view, partially broken away and partially in section, a collar, a stripper bar and a pusher assembly cooperating to remove plastic pipe from a mandrel.

The next step in this invention is to place a holding means such as a collar 28, shown in FIG. 5, around the pipe 90 into the grooves 84, 85 cut by the groove grinder assembly 22.

The collar 28 comprises two rings, a first ring 91 which is mounted around the outer surface of pipe 90 on the mandrel 12, and a second ring 92 laterally spaced apart, parallel and centrally aligned with the first ring 91, also mounted around the outer surface of the pipe 90. The first ring is positioned closer to the end of the mandrel over which the pipe is removed. Arrow 93 in FIG. 5 indicates the direction the pipe 90 is pulled as it is removed from the mandrel 12.

The second ring 92 of the collar has ear-like projections 110 extending radially outwardly from the mandrel. These projections are engaged by the means for applying an axial force to the pipe to strip it from the mandrel, described below. Each ring 91, 92 comprises two semicircular sections 111, 112 and a plate 94 which joins the semicircular sections together at adjacent ends 232 of the sections. Semi-cylindrical members 113 hold the rings 91, 92 together. One section 111 is welded to its plate 94 and the other section 112 of both rings, 91, 92 is mounted on a horizontal spindle 95 which extends through both plates 94. This collar is easily placed around a pipe by pivoting the semi-circular sections 112 mounted on the spindle 95 to open the gap 96 between the semicircular sections and then placing the collar over the pipe.

The first ring 91 does not force the pipe from the mandrel during the stripping operation. Its purpose is to provide stability to the collar when pipe is being stripped from the mandrel by preventing the second ring from tilting. It is the second ring which actually engages the pipe as most clearly shown in FIG. 6. The second ring 92 has two radially inwardly extending circumferential flanges, a first flange 98 and a second flange 100 which mate with the first 84 and second 85 grooves in the pipe wall, respectively. The flanges are also referred to herein as steps or projections.

Figure 6:
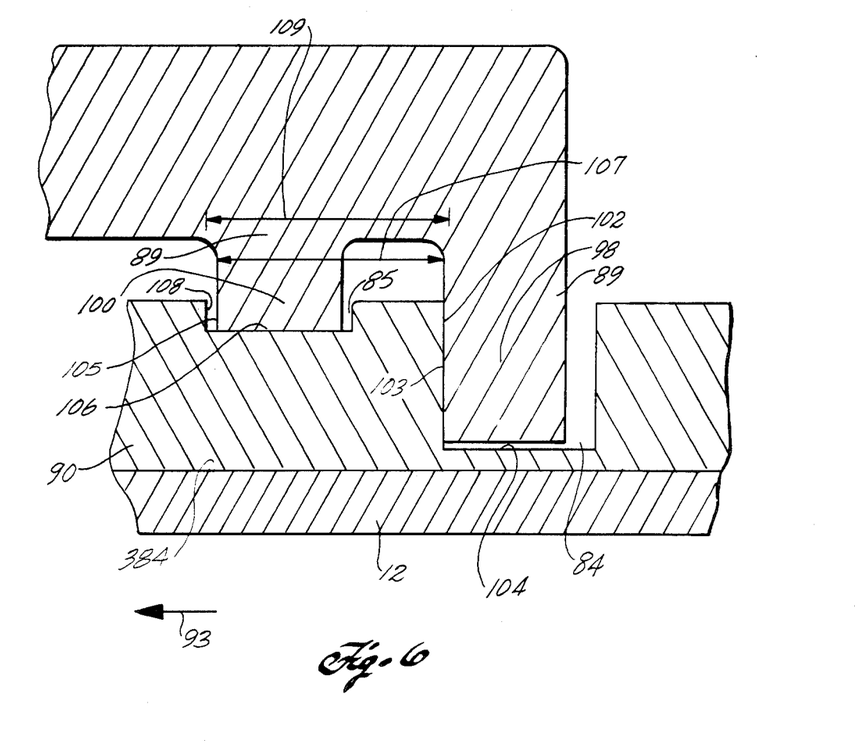
FIG. 6 is a view taken on line 6—6 in FIG. 5.

The height of the first and second flanges are such that the distance between the first flange 98 and the mandrel wall 384 is greater than the radial distance the second flange 100 can travel before it bottoms in the second groove 85. Thus if the pipe wall fractures at the deep groove, the second flange seats in the second groove before the first flange can engage and score the mandrel wall.

Either or both of the flanges can seat against the bottom of its mating groove.

The first flange 98 is seated against the wall 102 of the first groove axially closest to the mandrel end, referred to herein as "tailstock end", over which the pipe is removed while the second flange is seated away from the wall 108 of the second groove axially closest to the tailstock end of the mandrel. Arrow 93 in FIG. 6 indicates the direction the pipe is pushed during stripping. This configuration is obtained by forming the grooves and choosing flanges of the appropriate relative size so that the distance represented by the arrow 107 in FIG. 6 is less than the distance represented by the arrow 109 in FIG. 6. Arrow 107 marks the axial difference between the walls 103,105 of the first 98 and second 100 flanges, respectively, axially closest to the tailstock end of the mandrel. Arrow 109 represents the distance between the walls 102,108 of the first 84 and second grooves 85, respectively, axially closest to the tailstock end of the mandrel end.

The first groove 84 is substantially deeper than the second groove 85. Preferably the first groove is of the maximum depth possible so the wall 102 of the first groove closest to the tailstock end has maximum surface area for engagement with the collar. It is this wall 102 which bears the brunt of the pushing force during removal of the pipe from the mandrel. The second groove 85 preferably is of only nominal depth since its function is not to bear load during removal of the pipe, but only to avoid damage to the mandrel if the pipe fails at the first groove during removal. If the second groove 85 is too deep, it can weaken the load-bearing shoulder or wall 102 of the first deeper groove 84. Preferably, the second groove is cylindrical in shape so the second flange can seat against the bottom of the second groove.

As shown in FIG. 6, the second flange can extend radially inwardly a sufficient distance that it seats against the bottom of the second groove.

The distance the second flange travels before bottoming in the second groove is equal to the distance between the second flange and the bottom of the second groove when the groove is cylindrical. The distance of travel before bottoming can be less than the distance between the second flange and the bottom of the second groove if the second groove is of irregular shape, such as being "V-shaped" in cross-section.

The configuration discussed above and shown in FIG. 6 has many advantages. For example, only an axial and not a radial force is applied to the pipe because the wall 102 of the first groove 84 which the collar engages preferably is square shouldered and perpendicular to the axis of rotation of the pipe. Because the pipe is not pressed radially against the mandrel, it is easier to slide the pipe over the mandrel because there is less frictional resistance. Another advantage of pushing the pipe from the mandrel with a substantially pure axial force is that the pipe dilates and thus separates from the mandrel due to the axial compressive forces on the pipe. The compressive dilation is propagated down the length of the pipe, thereby sequentially freeing the entire pipe from the mandrel. Furthermore, plastic pipe can be substantially stronger in axial compression than it is in axial tension. Therefore, substantially more stripping force can safely be applied to plastic pipe by pushing instead of pulling.

Because of these advantages, it is possible to remove from a mandrel without damage or delay, pipe that would probably be destroyed if stripping by any other method were attempted.

Even if the pipe does fracture, the mandrel is not damaged because the fracture usually occurs at the first groove 84 rather than at the second groove 85 for two reasons. First, the pipe wall thickness below the first groove is thinner than the pipe wall thickness below the second groove. Second, axial tension is applied across the first groove while the second groove is in axial compression. When the pipe fractures at the first groove, the first flange 98 cannot slip against the mandrel 12 because the second flange 100 seats against the pipe wall. Thus scoring or scratching of the mandrel by the first flange is prevented.

Figure 4:
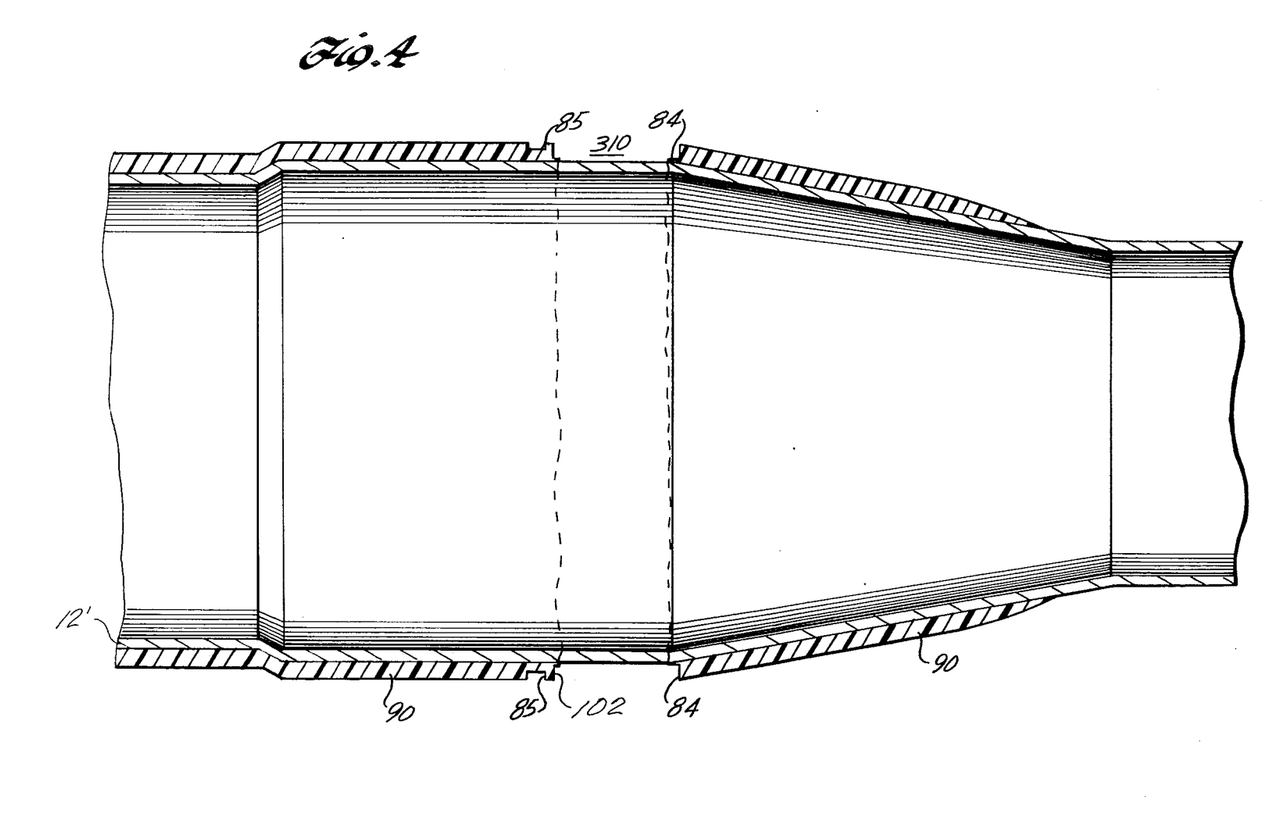
FIG. 4 is a fragmentary cross-sectional side view of plastic pipe on a mandrel with circumferential grooves cut into the pipe with the groove grinder of FIG. 2 after fracture due to stripping.

FIG. 4 shows a pipe 90 which is formed on a mandrel 12' which is larger in diameter in the middle than it is at the end. To strip the pipe from the mandrel it is necessary to separate the smaller diameter section from the main body of the pipe. This is easily accomplished using the method of this invention by forming the first and second grooves in the pipe wall in the region 310 of the larger diameter section just before the diameter of the pipe begins to decrease, and making the first groove 84 as deep as possible without cutting entirely through the pipe wall. When an axial force is applied to the pipe the pipe fractures at the deeper first groove 84 because that is the weakest point in the pipe wall. Therefore, using the method of this invention it is possible to economically and quickly separate the smaller diameter section from the pipe while at the same time stripping the pipe from the mandrel.

Figure 7:
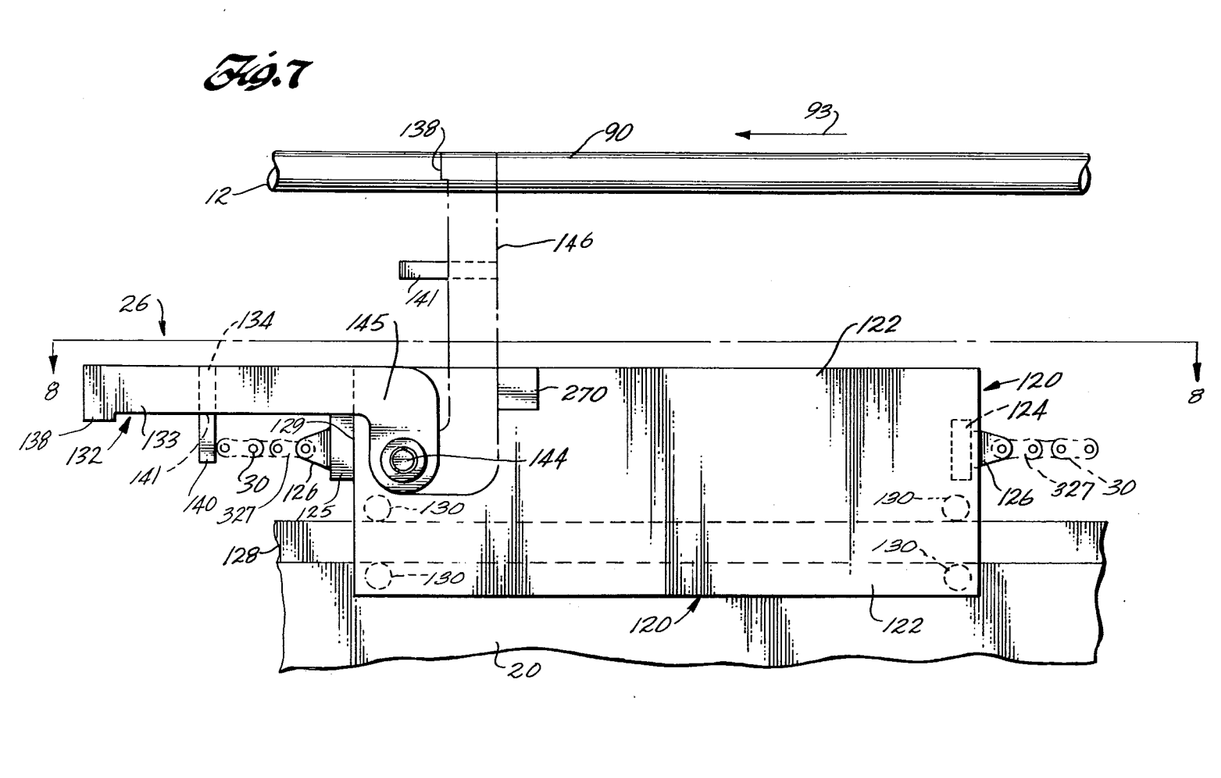
FIG. 7 is a side elevation view of a stripper carriage assembly.
Figure 8:
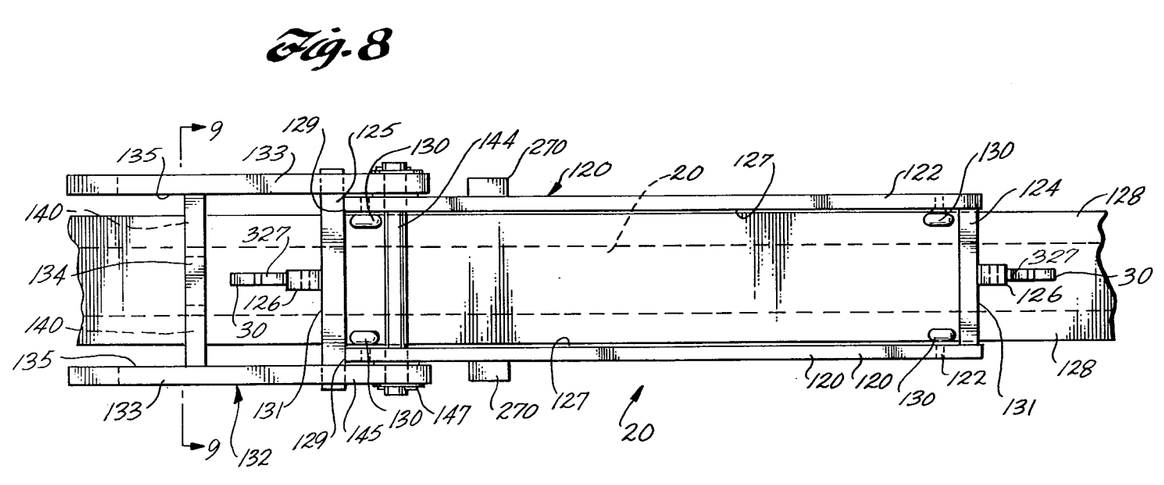
FIG. 8 is a top view of the stripper carriage assembly taken on line 8—8 in FIG. 7.

Means for applying a force in a substantially axial direction to the collar towards the mandrel end over which the pipe is removed is a stripper assembly 26 as shown in FIGS. 7 and 8. The stripper assembly 26 is positioned below the mandrel 12 and travels to and fro along the main box beam 20. The frame 120 of the stripper assembly 26 comprises a pair of elongated vertically orientated rectangular plates 122 laterally spaced apart and substantially parallel to the axis of the mandrel 12. The plates are welded at both ends to a pair of horizontal beams 124, 125, holding the plates 122 in spaced apart positions. The beam 124 at the headstock end of the stripper assembly is welded to the facing surfaces 127 of the rectangular plates 122, and the beam 125 at the tailstock end is welded to the ends 129 of each rectangular plate 122. Welded to the exterior surface 131 of each beam 124,125 is one of a pair of brackets 126 to each of which one of the end links 327 of the chain 30 used for pulling the stripper carriage assembly is pinned.

The stripper assembly rides on a flange 128 on top of the main beam 20 by means of rollers 130. There is a roller bolted to the rectangular plates 122 above and below the flange 128 at each edge of each of these plates 122, giving a total of eight rollers 130.

Figure 9:
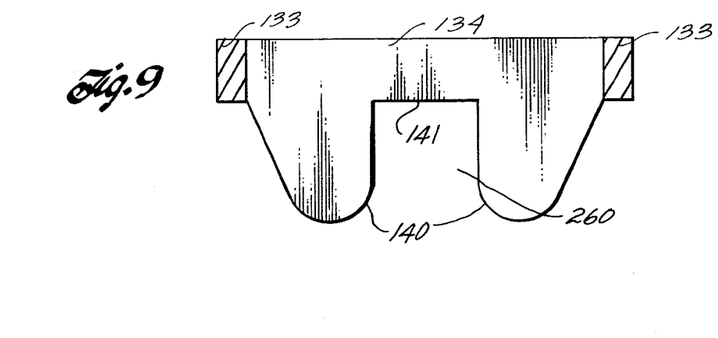
FIG. 9 is a view on line 9—9 in FIG. 8.
Figure 10:
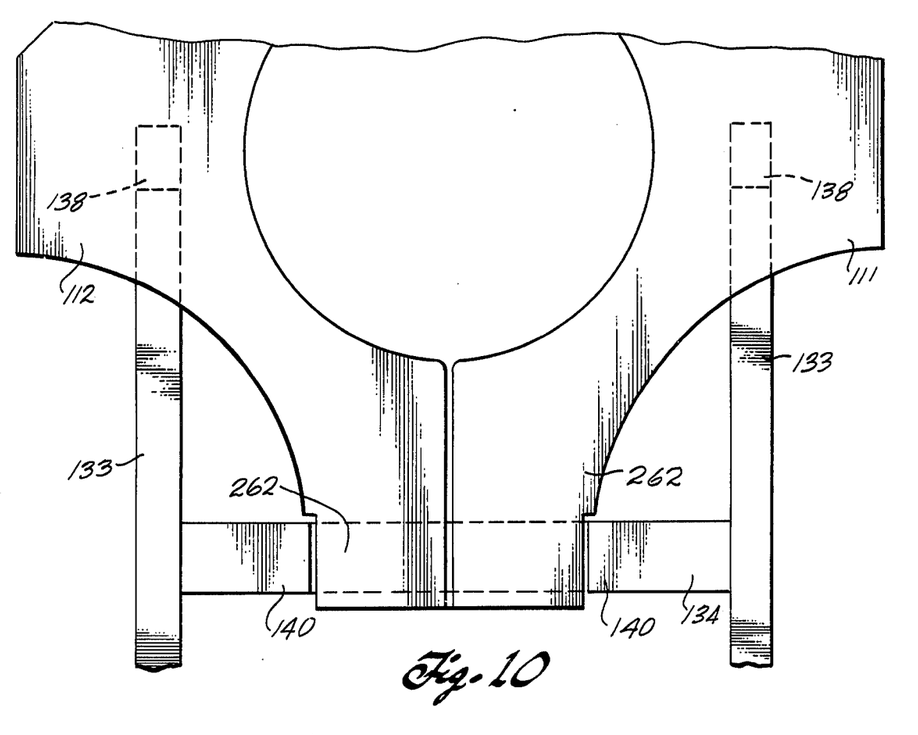
FIG. 10 is a view on line 10—10 in FIG. 5.

The portion of the stripper carriage assembly which actually pushes against the second ring 92 and the collar is pusher arms 132 which approximate the shape of football goal posts. The pusher arms consist of parallel L-shaped spaced apart bars 133 which are in a vertical position in the pushing mode and a crossbar 134 welded to the facing surfaces 135 of the vertical bars 133. The top portion of the vertical bars has a flat surfaced projection 138 extending towards the collar, and it is this projection 138 which engages the ears 110 of the second ring 92 of the collar 28 during the stripping operation. The base 145 of the L-shape is for pivotally mounting the pusher arms. There are triangularly shaped, spaced apart projections 140 on the ends of the surface 141 of the crossbar facing the collar. These projections extend underneath and support the second ring 92 of the collar during the stripping operation. As shown in FIG. 9, there is a gap 260 between the projections 140. A mating projection 262 of each of the two semicircular sections of ring 92 are held in this gap by the triangular projections 140 so the collar cannot disengage from the pipe when the pipe is being pushed from the mandrel.

The pusher arm 132 is mounted to pivot on a horizontally oriented spindle 144. The spindle extends through the plates 122 and the base 145 of the bars 133 of the pusher arms 132 which straddle the plates 122. A pair of pins 147, one through each end portion of the spindle, prevents the spindle from sliding loose.

When the stripper carriage assembly is not being used, the pusher arms 132 are down away from the mandrel, substantially parallel to the longitudinal axis of the mandrel and resting on the beam 125 at the tailstock end of the carriage assembly as shown in FIGS. 7 and 8. During the stripping mode the pusher arms 132 are pivoted so that the vertical bars 133 are vertically oriented against stop blocks 270 mounted on the frame 120 and the projections 138 on the bars are against the ears 110 of the collar assembly as shown in FIG. 5 and by phantom line 146 in FIG. 7.

Typically the force exerted by the chain drive on the stripper carriage assembly which pulls against the collar is sufficient to strip reinforced plastic pipe from the mandrel. However, there are times when this force is insufficient. This may occur when an improper type or an inadequate amount of release agent is used on the mandrel, or if the mandrel is not cleaned. When this occurs the pusher assembly 148 shown in FIG. 5 is used to provide sufficient extra force to break the pipe loose from the mandrel.

The pusher assembly 148 consists of two aligned, spaced-apart semicircularly curved bars 150, 151 bolted in their mid-section to opposite ends of a horizontal cylindrical rod 152. A pair of cylinders 153, each containing an oil actuated piston 154, are parallel to the rod 152 and are attached to the ends 155 of bar 150 and extend through bar 151. Each cylinder is clamped in place by a clamp bolt 271. There is a piston rod 157 extending out of the end of each cylinder and through the bar 151 attached to each piston 154.

This pusher assembly is placed onto the mandrel with the bar 151 through which the cylinder 153 extend facing the stripper carriage assembly pusher arm assembly 132 and the outer surface 155 of the other bar 150 up against a radially extending flange 156 of the mandrel 12. Projecting from the surface 155 of bar 150 facing the flange 156 are two pins 158 which rest on the top surface 159 of the flange 156, thereby orienting the pusher assembly. In operation the cylinders 153 are supplied with pressurized oil, and the pistons 154 push the piston rods 157 towards the pusher arms, thereby pressing the pusher arms against the collar 28 which is engaged with the pipe and forcing the pipe off the mandrel 12. It is preferred that the stroke of the piston rods be limited to the distance the pipe can axially compress without being permanently damaged such as by fracturing in case even with the pusher assembly the pipe cannot be removed from the mandrel.

After the pipe is removed, the sleeve 16 is placed back on the mandrel and the intermediate support 24 is lowered. Then the stripper carriage assembly is pulled towards the headstock end of the pipe making machine and the machine is ready for producing another length of plastic pipe.

Although this invention has been described in terms of preferred versions for removing pipe from a mandrel, other methods and apparatus embodying features of this invention for removing pipe from a mandrel are possible. For example, this invention may be used not only with the single mandrel pipe making machine of FIG. 1, but also in multi-mandrel pipe machines such as the merry-go-round type configuration shown in FIG. 17 of U.S. Pat. No. 3,616,063, or where the mandrels are mounted on a single frame in a Ferris wheel type configuration.

Because of variations such as this the spirit and scope of the appended claims should not be necessarily limited to the description of the preferred versions contained herein.

I claim:

1. A method for removing a cylindrical body from one end of a mandrel, wherein the body overlies and is coaxial with the mandrel, comprising the steps of:
   (a) forming a first indentation in the body wall where the depth of the first indentation is less than the body wall thickness;
   (b) forming a second indentation in the body wall such that the depth of the second indentation is less than the depth of the first indentation, the second indentation is axially closer than the first indentation to the mandrel end over which the body is removed, and the second indentation is axially spaced apart from the first indentation;
   (c) placing a first step of a holding means having at least two steps into the first indentation;
   (d) placing a second step of the holding means into the second indentation wherein the radial distance the second step can travel before bottoming in the second indentation is less than the distance the first step is placed spaced apart from the mandrel; and
   (e) applying a force to the holding means in a substantially axial direction towards the mandrel end over which the body is removed.

2. A method as claimed in claim 1 in which the first step of the holding means is placed in contact with the wall of the first indentation axially closest to the mandrel end over which the body is removed but the second step is not placed in contact with the wall of the second indentation axially closest to the mandrel end over which the body is removed.

3. A method as claimed in claim 1 in which the second step is in contact with the bottom of the second indentation.

4. A method as claimed in claim 3 in which the first step is not in contact with the bottom of the first indentation.

5. A method as claimed in claim 1 wherein the first indentation is substantially square shouldered.

6. A method as claimed in claim 1 in which the first indentation extends circumferentially around the body.

7. A method as claimed in claim 1 in which the second indentation extends circumferentially around the body.

8. A method as claimed in claim 7 in which the first indentation extends circumferentially around the body.

9. A method for removing a pipe from a rotatable mandrel coaxial with the pipe comprising the steps of:
   (a) forming a first circumferential groove in the pipe wall where the depth of the first groove is less than the thickness of the pipe wall;
   (b) forming a second circumferential groove in the pipe wall where the depth of the second groove is less than the depth of the first groove, and wherein the second groove is axially spaced apart from the first groove in the direction of travel of the pipe as it is removed from the mandrel;
   (c) placing a first step of a holding means having at least two steps axially spaced apart from each other in contact with the wall of the first groove axially closer to the mandrel end over which the pipe is removed;
   (d) placing a second step of the holding means into the second groove out of contact with the wall of the second groove axially closer to the mandrel end over which the pipe is removed wherein the radial distance the second step travels before bottoming in the second groove is less than the distance the first step is spaced apart from the mandrel; and
   (e) applying a force to the holding means in a substantially axial direction towards the mandrel end over which the body is removed.

10. A method as claimed in claim 9 in which the step of forming a groove comprises the steps of:
   (a) rotating the pipe;
   (b) forcing a rotating cutting means into the pipe wherein the cutting edge of the cutting means has projections corresponding to the shape of the grooves to be formed; and
   (c) removing the cutting means from the pipe before the groove extends completely through the pipe wall.

11. A method in claim 9 wherein the grooves are formed simultaneously.

12. A method as claimed in claim 9 in which the holding means is a cylindrical collar.

13. A method as claimed in claim 9 in which the first step is placed in contact with the bottom of the first groove and the second step is placed spaced apart from the bottom of the second groove.

14. A method as claimed in claim 9 in which the step of applying an axial force causes the first groove to extend through the pipe wall to the mandrel.

15. A method as claimed in claim 9 wherein the wall of the first indentation axially closest to the mandrel end over which the pipe is removed is substantially square shouldered.

16. A method for removing plastic pipe from a mandrel coaxial with the pipe over an end of the mandrel comprising the steps of:
   (a) rotating the pipe;
   (b) simultaneously forming a first circumferential groove and a second circumferential groove in the pipe wall by contacting the pipe with a rotating grinding wheel, wherein the depth of the first groove is less than the pipe wall thickness, the depth of the second groove is less than the depth of the first groove, and the second groove is axially spaced apart from the first groove and is closer than the first groove to the mandrel end over which the pipe is removed;
   (c) placing a cylindrical collar around the pipe by inserting a first step of at least two circumferential steps projecting radially inwardly of the collar against the wall of the first groove axially closer to the mandrel end over which the pipe is removed and away from the bottom of the first groove, and by inserting a second step against the bottom of the second groove and away from the wall of the second groove axially closer to the mandrel end over which the pipe is removed; and
   (d) applying a force in a substantially axial direction to the collar towards the mandrel end over which the pipe is removed.

17. A method as claimed in claim 16 wherein the wall axially closest to the mandrel end over which the pipe is removed of the first indentation is substantially square shouldered.

* * * * *